United States Patent Office 3,435,110
Patented Mar. 25, 1969

3,435,110
COLLAGEN FIBRIL MATRIX
PHARMACEUTICALS
Joseph Nichols, Princeton, N.J., assignor to Ethicon, Inc.,
a corporation of New Jersey
No Drawing. Filed Mar. 21, 1966, Ser. No. 535,708
Int. Cl. A61k 27/00, 9/00
U.S. Cl. 424—20
16 Claims The present invention relates to pharmaceutically active compositions containing collagen.

Medical preparations intended for oral administration are most frequently manufactured and dispersed in the form of tablets, as this dosage form offers the advantages of simplicity and economy in manufacture, convenience in packaging and shipping, and accuracy of dosage. As the science of pharmacy has advanced, the simple compressed tablet has been coated for the purpose of covering up medicinals that possess objectional tastes or odors, and to protect sensitive medicinals subject to deterioration. Some tablets are coated with substances that resist solution in gastric fluid but disintegrate and release their medication in the intestines. More recently, a large number of products have been introduced by pharmaceutical manufacturers that are intended to provide prolonged therapeutic action after oral administration. These products have been referred to as sustained release, timed release, prolonged action, long acting or by similar terms implying an extended period of action for a particular drug following ingestion.

I have now discovered that if collagen is present in a pharmaceutical tabletizing composition, it facilitates the break-up or disintegration of the tablet after administration and provides a matrix for the efficient release of the active pharmaceutical from the tablet.

In the practice of the present invention I prefer to use collagen that has been processed to remove impurities that are associated with collagen in its native state. Collagen swells rapidly at the pH normally present in the stomach, thus rupturing the tablet and forming a gel-like network or matrix of intertwining swollen collagen fibrils that occlude the active pharmaceutical. Thus, the active pharmaceutical that is close to the surface of the collagen matrix is almost immediately available and that portion of the active compound that is trapped deep within the collagen matrix will diffuse out slowly.

Tanning the collagen that is present in pharmaceutical compositions provides another means of controlling and prolonging the release of the active ingredients. Collagen that has been tanned with formaldehyde, or higher aldehydes such as acetaldehyde, glyoxol pyruvic aldehyde, glutaraldehyde, dialdehyde starch; or equivalent tanning agents, such as quinones, hydroquinones, dimethylol acetone, or divinyl sulfone, will not swell in acid solutions but is attacked by the enzymes that are present in the gastrointestinal tract at a rate that is dependent upon the tanning agent and the extent to which the collagen is tanned.

A long acting dosage formula can be conveniently prepared by compounding a pharmaceutical with untanned collagen and subsequently tanning various portions of the collagen-pharmaceutical mixture under different conditions to alter the rate at which collagen is absorbed in the gastrointestinal tract. The ultimate tablet is then formulated to contain the collagen-pharmaceutical composition in combination with controlled amounts of compositions containing the pharmaceutical and collagen that has been tanned to provide different digestive rates.

Yet another convenient and effective method of preparing a long acting dosage form is to coat a pharmaceutical tablet with a film of collagen in conventional pill-coating apparatus. The collagen coating may, if desired, be tanned to the extent that is calculated to produce the desired rate of release of the pharmaceutical, and the collagen coated tablet is subsequently coated with the pharmaceutical to provide a pharmaceutical layer overlaying the collagen coating. The product so obtained is then coated again with collagen and the outer layer of collagen may be tanned. In this manner successive alternate layers of the active pharmaceutical material and collagen may be built up to provide a dosage form that will release the pharmaceutical over a period of 10–12 hours.

The invention will appear more clearly from the following detailed description which will show, by way of example, preferred embodiments of the invention idea. Throughout the specification all parts are expressed in parts by weight unless otherwise indicated.

Example I

To 1000 parts of a mass of swollen collagen fibrils prepared as described in Example I of United States Patent No. 3,123,482 is slowly added with stirring 8.8 parts of dextroamphetamine sulfate, the resulting mixture is thoroughly homogenized to obtain complete distribution of the pharmaceutical throughout the viscous mass of swollen collagen fibrils, the mixture is filtered through a 7-mil filter screen, and spray dried. The dried powder is screened and formed into 50 mg. tablets.

Such tablets containing dextroamphetamine sulfate and collagen have utility as an appetite depressant; the collagen swelling several hundred times in volume under the acid condition present in the stomach to provide bulk and slow release of the dextroamphetamine sulfate.

Example II

A first portion of the dried powder of Example I above, prior to tableting, is entrained in a warm air stream containing 10 parts per million formaldehyde. The temperature of the air stream is maintained at 50°–60° C. and the dried powder is in contact with the formaldehyde vapor for five minutes.

A second portion of the dried powder of Example I above, prior to tableting, is entrained in a warm air stream containing 20 parts per million formaldehyde, The temperature of the air stream is maintained at 50°–60° and the dried powder is in contact with the formaldehyde vapor for five minutes.

To 15 parts of the powder described in this example that was tanned in an atmosphere containing 10 parts per million formaldehyde and 15 parts of the powder of this example that was tanned in an atmosphere containing 20 parts per million formaldehyde is added 15 parts of the powder described in Example I above. This mixture of three collargen-pharmaceutical polymers is mixed thoroughly in a conventional paddle mixer, screened, dried in a current of warm air and reduced in particle size to pass a 100 mesh screen. The resulting product is formed into 75 mg. tablets on conventional tablet-forming apparatus, these tablets provide a slow release of dextroamphetamine sulfate over a period of time and are useful as appetite depressants.

Example III

Forty-five parts of phenobarbital sodium, 45 parts of belladona extract, and 3000 parts of a mass of swollen collagen fibrils prepared as described in Example I of United States Patent 3,123,482 are mixed thoroughly in a paddle mixer and the composition is co-precipitated by pouring it slowly with stirring into a large volume of saturated ammonium sulfate. The precipitate is air dried, screened and divided into 3 equal portions.

The first aliquot part of this composition is not tanned. The second aliquot part of this composition is suspended in a warm air stream containing 20 parts per million of formaldehyde. The temperature of the air stream is maintained at 50°–60° C. and the dried powder is in contact with the formaldehyde vapor for 5 minutes. The third aliquot part of this composition is entrained in a warm air stream containing 50 parts per million of dimethylol acetone. The temperature of the air stream is maintained at 60°–70° C. and the dried powder is in contact with the dimethylol acetone for 10 minutes.

Equal amounts of the three aliquot parts of the composition are then recombined, intimately mixed, and passed through a 100 mesh screen. Gelatin capsules are filled with 200 mg. of the mixture so obtained. This product has utility as an anticholinergic agent.

Example IV

Twenty-four hundred parts of the deep flexor tendon of cattle are sliced and treated with ficin as described in Example VI of the United States Patent No. 3,114,593 at column 15, lines 53–71.

A swelling solution is made by adding 755 parts of citric acid to 86,265 parts of water. The drained tendon slices are added to the citric acid swelling solution, cooled to 20° C. and the solution is agitated for 1.5 hours by bubbling air through the mixture. The mixture is then agitated for one hour at 40 r.p.m. while maintaining the aqueous acid solution below 25° C. The suspension of swollen tendon slices is then homogenized by pumping the suspension through a ½-inch tube and through ⅛-inch jets.

The dispersion is next pumped through a 60-mil jet and then forced through a 50-mil jet. Finally, the dispersion is forced through 40-mil jets (two complete passes). The temperature of the dispersion is maintained below 25° C. throughout the homogenization step.

The dispersion so obtained is stored overnight at 25° C. without agitation. The following morning the dispersion is agitated for ½ hour at 40 r.p.m. and is then passed through a leaf filter containing 15-mil, 9-mil and 5.5-mil screens. During this filtration step, the pressure on the filter does not exceed 40 pounds per square inch.

Example V

A long-acting coronary vasodilator for the prevention of attacks of angina pectoris and for managing of coronary insufficiency is prepared by thoroughly mixing with stirring 10,000 parts of the collagen dispersion described in Example IV above and 8 parts of pentaerythritol tetranitrate. The composition so obtained is spray dried, and passed through a 100 mesh screen. Individual gelatin capsules are filled with 170 mg. of the product so obtained.

Example VI

Three hundred parts of reconstituted collagen tape prepared as described in Example X of U.S. Patent No. 3,114,593 are placed in a perforated metal basket which is placed in a stainless steel kettle. To this is added 151,412 parts of an aqueous solution containing 0.1% sodium chloride, and the tape is dispersed by stirring. The tape is allowed to soak in this solution for a period of 3–4 hours. After this, the liquid is drained and fresh saline solution is added. This process is repeated three times. The tape is then washed three times with 40,000 parts of distilled water for a period of 3–4 hours each washing.

An aqueous saturated solution of carbonic acid at 0–4° C. is then added to the washed and drained tape until the final volume is 34,000 parts by volume. The above carbonic acid solution is prepared by adding Dry Ice to distilled water and stirring until the temperature drops below 4° C.

The tape is then uniformly dispersed by gentle stirring for a few minutes. The container is lightly covered to keep the atmosphere above the liquid saturated with carbon dioxide gas and prevent its excessive loss. The collagen is allowed to swell overnight under these conditions.

After swelling, the resulting mass is thoroughly stirred for half an hour, and then homogenized by repeated passage through a ⅛-inch orifice.

Example VII

To 1000 parts of the collagen dispersion described in Example VI is added with stirring 8 parts of chloropheniramine maleate, the mixture is spray dried and may be converted into 20 mg. tablets on commercial tableting equipment. The product so obtained has utility as an antihistamine.

Example VIII

The collagen-chloropheniramine maleate composition prepared as described in Example VII is tanned with formaldehyde vapor (20 parts per million formaldehyde at 60°–70° C. for 5 minutes). Equal weights of this formaldehyde tanned powder and the untanned powder are combined in a ball mill and ground in the presence of Dry Ice until the particle size is such that the product readily passes through a 200 mesh screen. The powder mixture is then formed into 25 mg. tablets using commercially available tableting machinery. The product so obtained has utility as an antihistamine; the active ingredient being released over a long period of time.

Example IX

To 1000 parts of the collagen dispersion described in Example VI above is added one part of phenobarbital. The composition is spray dried, screened and formed into tablets weighing 50 mg. The tablets so obtained are coated in conventional pill coating apparatus with a dispersion of swollen collagen fibrils obtained by diluting 10 parts of the collagen dispersion described in Example VI above with 15 parts of cold freshly prepared saturated aqueous carbonic acid, until the collagen film on the exterior surface of each tablet is from about 0.1 to about 4 mils in thickness. The coated pills so obtained are tanned in an aqueous solution containing 4 ml. of 40% aqueous formaldehyde and 1 gram of aluminum ammonia sulfate per liter. The coated and tanned pills are then air dried at 70° C. for 10 minutes and then again coated with a slurry of 100 parts phenobarbital and 5 parts dextrine in water to form a layer approximately 5 mils in thickness of phenobarbital dextrine overlaying the collagen film surrounding the pill. This product is again coated with the collagen dispersion in accordance with the procedure described above in this example, and the collagen film so obtained is tanned with formaldehyde vapor (20 parts per million) at a temperature of 70° C. for 5 minutes to produce a product in tablet form built up of alternate layers of phenobarbital and tanned collagen fibrils.

Example X

To 100 parts of the collagen dispersion described in Example VI above is added with stirring 1 part of chlorpheniramine maleate. The mixture is spray dried and screened to pass through a 100 mesh screen. The powder is tableted to form 20 mg. tablets that are coated in pill-coating equipment with a dispersion of swollen collagen fibrils obtained by diluting 100 parts of the collagen dispersion described in Example VI above with 100 parts of cold freshly prepared saturated aqueous carbonic acid. The dried collagen coating is tanned in formaldehyde vapor (20 parts per million at 70° C. for 5 minutes) and the pills so obtained are recoated with the diluted collagen dispersion described above to build up a thicker collagen film on the surface of the tablet. Finally the coated pill is tanned with dimethylol acetone (50 parts per million at 90° C. for 5 minutes). The product so obtained is a long-acting antihistamine.

Example XI

A coronary vasodilator is prepared by thoroughly mixing with stirring 10,000 parts of the collagen dispersion described in Example VI above and 8 parts of pentaerythritol tetranitrate. The mixture is spray dried to produce a powder in which the active pharmaceutical is dispersed throughout a fibrilar network of collagen fibrils. During the spray-drying process the carbonic acid is volatilized to leave a residual collagen powder that is essentially neutral.

This spray dried powder is suspended in an air stream and passed through a chamber wherein it is subjected to a finely atomized spray of the collagen dispersion described in Example VI above. The moving stream of recoated particles passes from the spray coating chamber into a drying chamber heated to 80° C. Jets of high velocity air at 80° C. are directed into the drying chamber in such a manner that the recoated particles remain suspended in the air stream and do not settle out under the influence of gravity until dry. Formaldehyde vapor (at 20 parts per million concentration) is also introduced into the drying chamber so that the recoated collagen particles are tanned as they are dried. The dried powder from the drying chamber is collected and gelatin capsules containing 200 mg. of the tanned, collagen coated, pharmaceutical-collagen particles.

What is claimed:

1. A composition of matter in oral pharmaceutical tablet or pill, or pharmaceutical gelatin capsule dosage form consisting essentially of an effective oral dosage amount of a powdered pharmaceutically active material homogeneously dispersed throughout a powder matrix of collagen fibrils.

2. The composition of claim 1 wherein the collagen fibrils are tanned.

3. The composition of claim 1 wherein the collagen fibrils are tanned with formaldehyde.

4. The composition of claim 1 wherein the pharmaceutically active material is pentaerythritol nitrate.

5. The composition of claim 1 wherein the active pharmaceutical is d-amphetamine.

6. The composition of claim 1 wherein the active pharmaceutical is chlorpheniramine maleate.

7. A composition of matter in oral pharmaceutical tablet or pill or pharmaceutical gelatin capsule dosage form consisting essentially of an intimate mixture of collagen particles and tanned collagen particles, each of said collagen particles comprising a powder matrix of intertwined coalesced collagen fibrils and each of said collagen particles having homogeneously dispersed throughout its powder matrix an active powdered pharmaceutical compound.

8. The composition of claim 7 wherein the active pharmaceutical compound is pentaerythritol nitrate.

9. The composition of claim 7 wherein the active pharmaceutical compound is chlorpheniramine maleate.

10. The composition of claim 7 wherein the active pharmaceutical compound is dextroamphetamine sulfate.

11. A composition of matter consisting essentially of an effective oral dosage amount of a pharmaceutical in oral tablet dosage form, the exterior surface of said tablet being coated with a film of collagen fibrils at least about 0.1 mil in thickness.

12. The composition of claim 11 wherein the collagen film is tanned.

13. The composition of claim 11 wherein the collagen film is tanned with formaldehyde.

14. A pharmaceutical oral dosage form tablet consisting essentially of alternate layers containing an effective dosage amount of a powdered pharmaceutically active compound at least about 5 mils in thickness and collagen fibrils overlying the tanned collagen fibril film of the composition of claim 12.

15. The tablet of claim 14 wherein all or some of the overlying alternate collagen fibril layers are tanned.

16. The tablet of claim 15 wherein some of the collagen layers are tanned more than other collagen layers, whereby the digestion rate of the different collagen layers will differ.

References Cited

UNITED STATES PATENTS

| | | | |
|---|---|---|---|
| 1,021,674 | 3/1912 | Horowitz | 167—82 |
| 2,625,158 | 1/1953 | Lee et al. | 128—260 |
| 2,656,298 | 10/1953 | Loewe | 167—55 |
| 3,003,911 | 10/1961 | Lindstrom et al. | 162—100 |
| 3,073,702 | 1/1963 | Keil et al. | 99—169 |
| 3,114,593 | 12/1963 | Griset et al. | 18—54 |
| 3,123,482 | 3/1964 | Lieberman | 99—176 |
| 3,186,910 | 6/1965 | Glassman | 167—83 |
| 3,228,789 | 1/1966 | Glassman | 117—118 |
| 3,239,420 | 3/1966 | Gonshbry et al. | 167—83 |
| 3,275,519 | 9/1966 | Glassman | 167—82 |

LEWIS GOTTS, *Primary Examiner.*

S. K. ROSE, *Assistant Examiner.*

U.S. Cl. X.R.

424—21, 22, 263, 298, 330, 359